(12) United States Patent
Morag

(10) Patent No.: US 6,324,545 B1
(45) Date of Patent: *Nov. 27, 2001

(54) PERSONALIZED PHOTO ALBUM

(75) Inventor: Guy Morag, Kohav Yair (IL)

(73) Assignee: ColorDesk Ltd., Tel Aviv ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,931

(22) Filed: Oct. 15, 1997

(51) Int. Cl.$^7$ .................................................. G06F 17/30
(52) U.S. Cl. .............................. 707/202; 358/408; 702/1
(58) Field of Search ............................. 281/15.1; 283/67; 412/1; 705/26, 27; 707/202; 358/408; 702/1

(56) References Cited

U.S. PATENT DOCUMENTS

| | | | |
|---|---|---|---|
| 5,114,291 | * | 5/1992 | Hefty ........................................ 412/8 |
| 5,190,316 | * | 3/1993 | Hefty ................................... 281/15.1 |
| 5,213,461 | * | 5/1993 | Kalisher .................................... 412/4 |
| 5,478,120 | * | 12/1995 | D'Andrea .............................. 283/117 |
| 5,564,005 | * | 10/1996 | Weber et al. ......................... 395/161 |
| 5,592,511 | * | 1/1997 | Schoen et al. ........................ 375/220 |
| 5,625,776 | * | 4/1997 | Johnson ................................ 395/237 |
| 5,685,002 | * | 11/1997 | Sano ..................................... 395/779 |
| 5,802,492 | * | 9/1998 | Delorme et al. ...................... 701/201 |
| 5,860,068 | * | 1/1999 | Cook ....................................... 705/26 |
| 5,890,175 | * | 3/1999 | Wong et al. .......................... 707/505 |
| 5,899,502 | * | 5/1999 | Del Glorno ............................. 283/67 |
| 5,949,551 | * | 9/1999 | Miller et al. .......................... 358/408 |
| 6,069,712 | * | 5/2000 | Dellert et al. ......................... 358/408 |
| 6,092,023 | * | 7/2000 | Kunishige ................................ 702/1 |
| 6,154,755 | * | 11/2000 | Dellert et al. ......................... 707/526 |

FOREIGN PATENT DOCUMENTS

WO 90/11587 * 10/1990 (WO) ..................................... 705/26

* cited by examiner

Primary Examiner—Wayne Amsbury
(74) Attorney, Agent, or Firm—Pillsbury Winthrop LLP; David H. Jaffer

(57) ABSTRACT

A method of generating an album, comprising: providing a plurality of digitally encoded images, automatically arranging at least some of the images to fit a format of an album and printing a photograph album using the determined arrangement. Preferably, each page of the album is a single sheet of photographic paper.

65 Claims, 1 Drawing Sheet

PERSONALIZED PHOTO ALBUM

FIELD OF THE INVENTION

The present invention relates to automated creation of personalized picture albums, using digitally acquired or digitized pictures.

BACKGROUND OF THE INVENTION

In the past, image acquisition was dominated by film based systems, such as cameras. Lately, however, cheap, digital image acquisition systems, such as digital filmless cameras and scanners have become widespread for personal use. There have also become available various ways of generating high-quality digital images, including, generation of images by computer and scanning of film images at central locations, such as photo development laboratories.

Once digital images are available, it is easy to send the images, using computer communication techniques, to service providers which create customized products using the images, for example, printing the images on T-shirts.

In many cases, it is desirable to obtain a hard copy (paper) of an image. There are currently two principle ways, for an individual, to obtain such images at low cost. A first way is to print the images using a color printer. Generally, however, the quality obtainable from a low-cost color printer is significantly lower than that of photographic images. A second way is to send the digital representation, via computer communications, to a central site. At the central site the images are printed on photographic paper and then sent back to the individual, by mail.

When an individual amasses a large number of photographic prints, he usually organizes them in a picture album. Such an album typically contains pages of stiff paper or cardboard, to which the pictures are attached by various means. In some albums, the pictures are laminated unto the paper pages.

SUMMARY OF THE INVENTION

It is an object of some aspects of the present invention to provide a method of automatically generating a photograph album, utilizing digital techniques.

In accordance with a preferred embodiment of the invention, digital techniques are used in the process of generating photograph albums. Preferably, the use of such digital techniques enhances the quality of the resulting album. Alternatively or additionally, these techniques are used to automate tasks which are tedious for a human. Such tasks include arranging images on pages and grouping together images of similar subjects.

In accordance with a preferred embodiment of the present invention, a personalized photograph album is generated as follows:

(a) a customer acquires digital images;

(b) the customer transmits the images to a service provider;

(c) the service provider arranges the images into an album format;

(d) the service provider prints out the images and assembles the album; and (e) the album is mailed to the customer.

One aspect of some preferred embodiments of the present invention relates to a method of automatically arranging the images on the pages of the album. In one preferred embodiment of the invention, the images are arranged based on image content, image weight and symmetry between images, using color and/or intensity considerations, order and time between the acquisition of the images, grouping together of similar images, for example based on color profile or correlation and/or based on text labels which are attached to at least some of the images. In a preferred embodiment of the invention, such text labels need only be specified for the first images in a sequence of images, since, the rest of the sequence can be determined from the relative time of image acquisition. Preferably, the text annotations are created by recording a sound bite with each image and applying a speech recognition algorithm to decipher the contents of the annotation. A speech recording mechanism is preferably included as part of a digital camera used to acquire images and/or in a video camera.

In a preferred embodiment of the invention, the images are arranged to minimize the number of pages and/or amount of wasted space in the album. This type of arrangement is especially important when the images are not all the same size.

In a preferred embodiment of the invention, the customer can select what type of arrangement to use. Further, the user can preferably select values for various parameters of these automatic arrangement methods. In addition, the customer can preferably select the format of the album, including, the number of pages, the shape of the pages and the location of punched holes in the pages. In addition, the customer can preferably select a theme for the album. In a preferred embodiment of the invention, the automatic arrangement includes automatic scaling of individual images. Alternatively or additionally, automatic arrangement includes automatic filtering of the images so that the resulting album does not include all the supplied images. Preferably, such automatic filtering includes filtering based on image quality, on the number of allowed images in a particular album, on the amount of available space, on the existence of doubles of particular images and/or user supplied criteria for grading of the images.

Another aspect of some embodiments of the present invention is related to customization of photographic albums. In a preferred embodiment of the invention, a customer defines and/or selects a theme for a photographic album. The automatic arrangement and/or formatting instructions are preferably carried out in view of the selected theme. Optionally, a customer creates several different albums, from a single set of images, using different themes. Such themes may include, a background pattern, possibly for each page, a general layout of the album, including image enlargements, in addition to arrangement, grouping and filtering instructions.

Another aspect of some embodiments of the present invention relates to a particular physical structure of an album. In a preferred embodiment of the invention, rather than generate individual images and attach them to album pages, a plurality of images are printed on a single sheet of photographic paper and that sheet is used as a page in the album. Preferably, two-sided photographic paper is used, with images printed on either side. Alternatively, two individual sheets are glued back-to-back, preferably with a stiffener between them to form a two-sided page. In a preferred embodiment of the invention printed images do not reach the edge of the photographic sheet, so that the sheets can be bound together. Preferably, the individual pages are laminated. Alternatively, the images are printed directly on a laminate. Alternatively, the customer prints the album at home using a color printer, utilizing the automatic arrangement and/or album generation features described herein, which are preferably provided by a service provider. Optionally, automatic arrangement and formatting of the images is also performed on the customer's computer.

Another aspect of some embodiments of the present invention relates to adding text, graphics and/or computer generated images to the album. Preferably, such additional information is also printed on the photographic paper, at the same time as the images. Additionally, such text is preferably automatically arranged with the images.

Yet another aspect of some aspects of the present invention relates to automatic generation of a panoramic image from a plurality of supplied overlapping images. Preferably, the customer marks the images that are overlapping and the service provider automatically correlates them and generates a panoramic image. Alternatively, the service provider automatically detects the overlapping images. Such a panoramic image may be a one or two dimensional mosaic. Alternatively or additionally, the service provider automatically correlates images of the same object acquired a short time apart. In a preferred embodiment of the invention, the service provider marks, on the images, any differences between the images. Preferably such marking is achieved using a graphic overlay, such as a rectangular indication or an arrow. The order of such images is preferably determined by a time/date stamp thereof, which is a common feature in most digital image acquisition systems.

There is therefore provided in accordance with a preferred embodiment of the invention, a method of generating a photographic album, comprising:

providing a plurality of digitally encoded images;

automatically analyzing said images; and automatically generating an album responsive to said analyzing.

In a preferred embodiment of the invention, said generated album is a proof album and the method comprises:

providing the proof album to a customer;

receiving comments on said proof album from said customer; and repeating said generating responsive to said received comments.

Preferably, providing a proof comprises providing an electronic copy of said proof at an interactive Internet site. Preferably, providing the proof album comprises providing an electronic copy of said album to a customer. Preferably, the electronic copy is maintained at an interactive Internet location. Preferably, individual pages of said electronic copy may be accessed interactively, at said Internet location.

Alternatively or additionally, generating comprises printing at least one image of said album on photographic paper. Preferably, printing comprises printing a plurality of images on a single page of said album.

Alternatively or additionally, printing comprises printing labels on at least one page of said album.

Alternatively or additionally, printing comprises printing a background around at least one image on at least one page of said album.

Alternatively or additionally, said background comprises one of said images. Preferably, at least two different backgrounds are printed for at least two different pages of said album.

Alternatively or additionally, said analyzing comprises determining a type of individual ones of said images.

Alternatively or additionally, analyzing comprises determining at least one grouping of ones of said images.

Alternatively or additionally, analyzing comprises determining at least one association of ones of said images to a composite image.

Alternatively or additionally, generating an album comprises automatically arranging at least some of said images in said album. Preferably, arranging comprises arranging said images according to type. Alternatively or additionally, arranging comprises arranging said images according to a grouping of the images. Alternatively or additionally, arranging comprises arranging said images according to acquisition time of the images. Alternatively or additionally, arranging comprises arranging said images in separate sections of said album. Alternatively or additionally, arranging comprises arranging said images responsive to annotations of said images. Alternatively or additionally, arranging comprises arranging said images responsive to a theme of said album. Alternatively or additionally, arranging comprises arranging titles associated with said images. Alternatively or additionally, arranging comprises arranging images responsive to a physical aspect of said album. Alternatively or additionally, arranging comprises arranging images on a page of said album responsive to a symmetry of said images. Alternatively or additionally, arranging comprises enlarging at least one of said images. Alternatively or additionally, arranging comprises reducing in size at least one of said images. Alternatively or additionally, arranging comprises automatically selecting at least one of said images to be enlarged.

In a preferred embodiment of the invention, generating an album comprises filtering said images to generate a selected set of images and generating an album using only the selected images. Preferably, filtering comprises selecting images based on an image quality measure. Alternatively or additionally, filtering comprises selecting images based on the number of repetitions of images. Alternatively or additionally, filtering comprises selecting images responsive to a predetermined size of said album. Alternatively or additionally, filtering comprises selecting images responsive to a predetermined cost of said album.

In a preferred embodiment of the invention, generating an album includes generating an index for said album. Preferably, generating an index, comprises generating an index according to a grouping of the images. Alternatively or additionally, generating an index, comprises generating an index according to contents of text label associated with the images. Alternatively or additionally, said index includes page number references.

In a preferred embodiment of the invention, the method comprises processing at least one of said images. Preferably, processing comprises motion deblurring of said image. Alternatively or additionally, processing comprises color correcting of said image. Alternatively or additionally, processing comprises histogram equalization of said image. Alternatively or additionally, processing comprises generating a composite image of a plurality of said images. Preferably, generating a composite image comprises generating an image mosaic from a plurality of overlapping ones said images. Preferably, said analyzing comprises determining overlaps between said images.

There is also provided in accordance with a preferred embodiment of the invention, a photographic album, comprising:

a plurality of sheets of photographic paper, at least one of said sheets having printed thereon a plurality of images; and a binder, attaching said sheets.

Preferably, the sheets are laminated with a clear laminate. Alternatively or additionally, at least some of said sheets are attached, back-to-back to others of said sheets. Preferably, the album comprises at least one stiffener between said back-to-back attached sheets.

Alternatively or additionally, said sheet is printed on two sides thereof. Alternatively or additionally, said sheets include holes for the binder and said images do not overlap the holes.

There is also provided in accordance with a preferred embodiment of the invention, apparatus for generating an album comprising:

a network connector, adapted to receive data from a computer network;

an image store, which receives and stores a plurality of digitally encoded images from said network; and an image arranger which generates an arrangement of images, for an album, for said plurality of images.

Preferably, the apparatus comprises an image analyzer, which analyses said images, wherein said image arranger arranges images responsive to said analysis. Preferably, the apparatus comprises an instruction store, which stores instructions for arrangement, wherein said image arranger arrangers said images responsive to said instructions. Preferably, said network connector receives at least some of said instructions from a customer.

Alternatively or additionally, the apparatus includes an album generator, which generates an album responsive to said arrangement. Preferably, said album comprises an electronic album. Alternatively or additionally, said album comprises a photographically printed album.

BRIEF DESCRIPTION OF THE DRAWINGS

The present invention will be more clearly understood from the detailed description of the preferred embodiments with reference to the accompanying figures, in which.

DETAIL DESCRIPTIONS OF PREFERRED EMBODIMENTS

Figure 1:
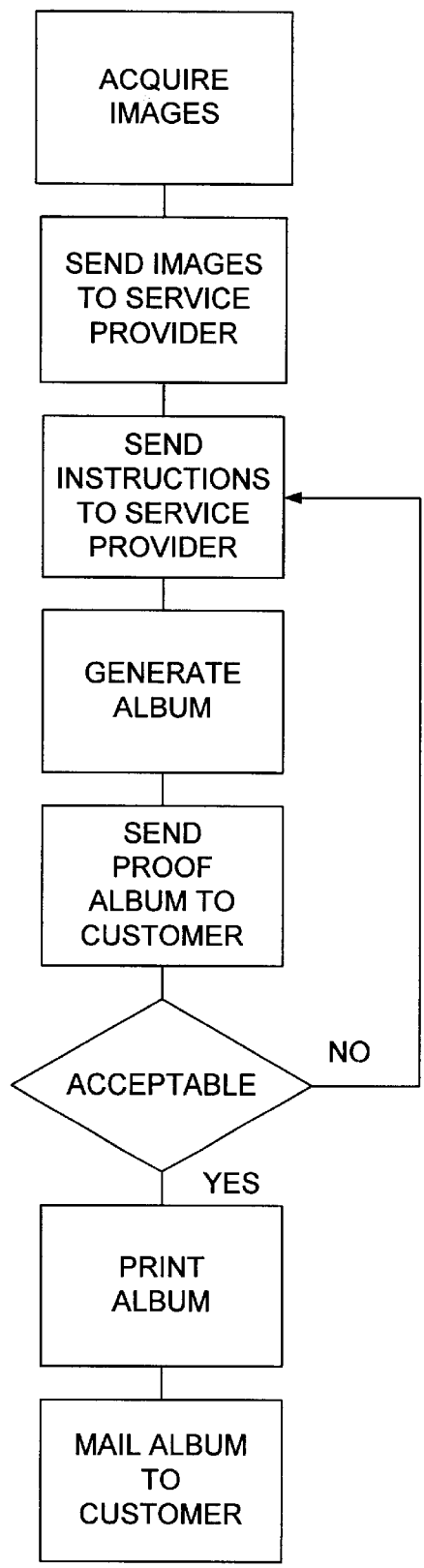
FIG. 1 is a flowchart of a method for automatically generating a photograph album, in accordance with a preferred embodiment of the invention.

FIG. 1 is a flowchart of a method of automatically generating a photograph album, in accordance with a preferred embodiment of the invention. First, a customer acquires a plurality of images. In one preferred embodiment of the invention, the customer uses a digital camera to directly acquire digital images. However, a scanner can be used to digitize pre-existing paper images and/or film. Alternatively, a video-frame grabber can be used to digitize a plurality of consecutive or non-consecutive frames from a video stream. In accordance with a preferred embodiment of the invention, such a digital camera is sold bundled with a connector for downloading the acquired images to a personal computer and with software for manipulating the acquired images.

One of the typical uses of cameras is to acquire a large number of pictures, especially during sight-seeing trips. Many of these pictures may not be of high quality and some may be retakes of similar scenes. A tedious task, which most travelers face after such a trip, is organizing all the acquired pictures into photo albums, so as to create a record of the trip. When the images are stored on a digital media, it is possible to use a personal computer to organize the images. However, the quality of printing at home is usually much lower than that possible by professional photographers. In addition, organizing a large number of pictures is a difficult task.

In a preferred embodiment of the invention, as shown in FIG. 1, the arrangement of the images into an album is performed by a service provider. The acquired images are preferably transmitted to the service provider by digital means, most preferably by computer communications, such as over the Internet. However, the images may also be sent on a storage medium. Alternatively, the images can be sent as paper photographs, which the service provider scans. In addition to images, the customer preferably sends instructions, as described below, regarding how the images should be arranged into the album.

In accordance with a preferred embodiment of the invention, images are uploaded to the service provider using a secure data transmission protocol, such as described in U.S. patent application Ser. No. 08/919,682, titled "File Upload Synchronization", filed Aug. 28, 1997, by Guy Morag, et. al, the disclosure of which is incorporated herein by reference.

The arrangement of the images is preferably performed, automatically by a computer, at the service provider. It should be noted that many of the actions described herein as being performed by a service provider may, in alternative preferred embodiments of the invention, be performed by software on the customer's computer. Preferably, such software is supplied by the service provider. Preferably, such software is downloaded from the service provider, when needed.

Once the arrangement of images in an album is performed by the service provider, an electronic proof copy of the album is optionally sent to the customer for approval. This proof copy album may, of course be printed and sent by mail, however, in accordance with a preferred embodiment of the invention, the proof album is sent to the customer by electronic means, such as by e-mail. An e-mail copy of the album preferably includes computer-readable instructions for viewing and/or printing of the album. More preferably, the proof copy is maintained at a web site by the service provider, where the customer can browse the proof copy and enter comments.

In a preferred embodiment of the invention, the proof album location is linked to the web site at which the pictures are uploaded to the service provider. Preferably, the album is rapidly generated soon after the images are uploaded or even while the images are uploaded, to provide the customer with fast feedback. Preferably, the album is generated using thumbnail images which are uploaded prior to uploading the full-size high quality images. The album may be generated based on the thumbnail images, and the customer may comment on these images, during the upload of the complete image set. Further, images which are filtered out described below) need not be uploaded. Still further, the resolution of the uploaded image may be made dependent on the final size and/or resolution of the image in the album. Preferably, the proof copy is maintained in confidence by requiring a password to reach the web site. Alternatively or additionally, the customer can print out a low-quality copy of the album on a personal color printer. The comments may include, inter alia, changes in the formatting instructions, addition or removal of images and additional limitations on the formatting, as described below.

The customer's comments are preferably used to perform a second iteration of the arrangement of the album. Usually, two or three such iterations will suffice for a suitable album to be generated and accepted by the customer. Once the album is accepted by the customer, the service provider prints the album and mails the final album to the customer. The mailed album preferably includes, on digital media, an electronic copy of the album, the original images, the images as incorporated in the album and/or the images not included in the album. Images which are not included in the album may also be attached to the mailed album in the form of hardcopies, preferably as thumbnail images. Preferably, an explanation as to why each of the images was not included is also attached. Alternatively to using a proof album, the entire album creation process is automated and no proof copy is sent to the customer before the final album is sent.

Figure 2:
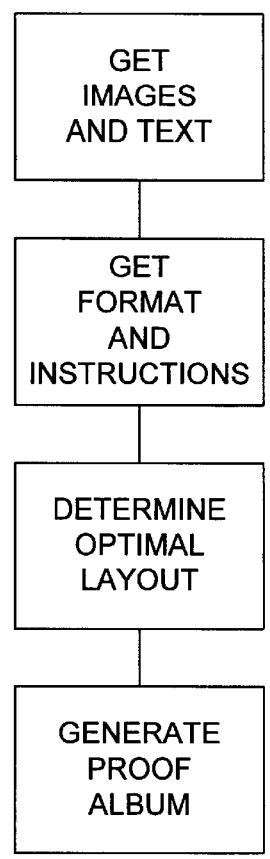
FIG. 2 is a flowchart of a method for automatically arranging images and text, in accordance with a preferred embodiment of the invention.

FIG. 2 is a flowchart of a method of automatically arranging images and/or text, in accordance with a preferred embodiment of the invention. After the images and instructions for album arrangement are received by the service provider, an optimal layout of images in the album, as per instructions received from the customer, is determined. A proof album is generated based on the optimal layout. If no instructions are provided by the customer, the service provider may generate an album using default parameter values. The instructions for album arrangement can come in many forms, however, in a preferred embodiment of the invention, a subset of the following instruction types is used to define the album to be generated:

(a) filtering instructions, which determine what images or types of images will or will not be used in the album;

(b) arrangement instructions, which determine the layout methodology of images on the individual pages of the album;

(c) label instructions which associate text and/or graphic labels with each image and/or group of image;

(d) binding instructions, which determine the number of pages, page size and shape and the type of binding to be used for the finished album;

(e) composition instructions, which determine if and how images should be combined into mosaics;

(f) background instructions, which determine the background to be printed on pages of the album;

(g) formatting instructions, which describe the format of images, including their size;

(h) processing instructions, which describe what type, if any, of image processing is to be performed on some or all of the images;

(i) theme instructions, which describe a general theme or ambiance desired for the album; and (j) individual instructions, by which a customer makes small changes (tweaks) to the album layout suggested by the service provider.

It should be appreciated that one type of instruction provided can affect the results of another type of instruction. For example, if a ring-bound type album is selected, this will affect the layout of images on a page, since the images are generally not printed where a hole is to be punched.

The above instructions may be directed to all the images. Alternatively, the images may be grouped and each group receives different instructions. Preferably, meta instructions are directed to defining the hierarchy and/or precedence of instructions for different groups.

The grouping of images can be based on many considerations, which are preferably selected by the customer or which are default. For example, images may be grouped based on a temporal clustering of the images according to time of acquisition. Thus, images from a single trip will be grouped by the date and time-of-day, which also usually represents a grouping by location. In another example, images are grouped by image type, by an algorithm which preferably, using image morphology, classifies images as portrait images, scenic images, flower close-up images and the like. Image type is preferably determined based on a comparison with a set of templates. Alternatively, image type may be determined by analyzing a plurality of spatially separated locations on the image. In yet another example, images are grouped based on content, with images having a high correlation being grouped together. This correlation may be caused by overlap of the images, similar subject matter in the images and/or the images being of the same object. In another example, images are grouped based on attached titles and/or voice annotations provided with the images. In yet another example, images are grouped based on the photographic conditions at the time of acquisition, which are preferably stored with the images. Typically, indoor images and outdoor images are acquired under different conditions and, thus, they may be automatically grouped. These groupings may be performed automatically by the service provider or manually by the customer. Preferably, each group starts on a new page of the album; in some cases, on a new double page.

Filtering instructions are directed towards including in the album only some of the available images. In some cases, there are simply more images than space available in the album. In many cases, several images of the same object are acquired. Some of the images may be out-of-focus, blurred, contain glare, be unbalanced (such as by having a large image moment) or otherwise be of low quality. In a preferred embodiment of the invention, when there are more than one image of a particular subject, only the higher quality images are used. Alternatively, if one image is an enlargement of the other, the enlargement is used. Alternatively or additionally, such selection by quality is performed by grouping, such as by type of image, so that the highest quality images are selected from each group. Alternatively or additionally, such selection by quality is performed on all the images as one unit, so that no low quality images will be included in the album. The image quality measure is preferably defined by the customer, preferably by selection from a short list of quality criteria. In a preferred embodiment of the invention, a customer ranks the types of images so that different quality images of each type may be allowed.

It should be noted that a single image may appear more than once in the album, for example, by itself and as part of a composite image or even as part of two groups.

It should be noted that the quality of the individual image may also be an input to an automatic algorithm which determines the layout of the images. Typically, higher quality images are selected to be in prominent locations and/or enlarged.

Arrangement instructions are directed towards the method of arranging the images on each page of the album. There are two types of considerations. First, the album as a whole must be considered. Typically, an album is divided into sections, each section related to a different group. Second, on each page and/or within each section there are local considerations. Some considerations which may be taken into account in preferred embodiments of the invention, include, color balance between the selected images; image weight, which is usually defined by the average pixel value; symmetry between images, which may be defined by the total moment of all the images on a page; the size and shape of the page; and the binding type. As part of the arrangement, an image might be enlarged, reduced in size or even cropped, to preserve such balance. In addition, arrangement preferably takes into account the placement of titles relative to the images. In one preferred embodiment of the invention, the customer defines an association between images, such as the order and/or grouping of the images and the service provider automatically determines where a page break occurs and which images will be on facing pages. For example, a panoramic combination will usually be arranged not to split between pages, especially if the pages do not face each other. Thus, in some preferred embodiments of the invention, the images may be considered to be an image document, for which the computer performs automatic typesetting and formatting. One advantage of image documents, as opposed to text documents, is that the order of the images can usually be changed around to some extent, without detracting from the content of the document. In images sequences, such as those which document changes in an object of interest, such rearrangement is usually not desired. Thus, in a preferred embodiment of the invention, images are assigned a grade which indicate the importance of them staying in order, which grade is taken into account when deciding which images to rearrange.

In a preferred embodiment of the invention, higher quality images are enlarged. Such images may be enlarged to span two pages. In such a case, the placement of halves of the images is preferably such that when the album, in its bound form, is opened, the image will be contiguous. The image to be enlarged may be automatically selected. Alternatively, it may be selected by the customer.

Label instructions relate labels to images. These instructions may include the formatting of the labels, such as size, color and font, the allowed distance between a label and an image, any text and/or graphics which form the label and the interplay between associating a label with an image and the automatic arrangement of the images. In a preferred embodiment of the invention, a user enters an annotation into a camera while acquiring the image. This annotation may be a text annotation or it may be a voice annotation. In a preferred embodiment of the invention, such annotation is used to group the images as described above. Alternatively or additionally, the annotation may also be used for labeling the image. In a preferred embodiment of the invention, the service provider performs speech recognition on the voice annotation to generate a text label.

In a preferred embodiment of the invention, labels may be overlaid on the images. Preferably, the customer selects the exact location of the label. However, in a preferred embodiment of the invention, the label is automatically located in a low information/low contrast portion of the image. Labels may have a transparent background or they may have an opaque background. Transparent and/or opaque images may also be used between images, since the background of the album page usually also contains a pattern or an image.

Binding instructions define the external form of the album, such as: the size and number of pages; the shape of the pages, which need not be rectangular, for example, pages may be heart shaped; the type of binding, including how the pages are attached together, whether there is a cover for the album; and/or the use of gilding around page edges. The cover definition may include text and or images to include on the cover. In accordance with a preferred embodiment of the invention, an album size and/or type is automatically selected to match various parameters of the image set, for example, the number of images. Preferably, the customer places limitations on the total cost of the album and/or on the acceptable size range. These limitations can be used to further define the exact type of album to be used.

In accordance with a preferred embodiment of the invention, the type of page for the album may also be selected. In one preferred embodiment of the invention, the pages of the album comprise a single sheet of photographic paper unto which several images and/or labels may be printed. Alternatively, two such sheets may be glued back-to-back to make one two-sided page. Preferably, a stiffener is inserted between the two photographic sheets. Alternatively, a two-sided sheet photographic paper is used, with images printed on both sides of the sheet.

Alternatively or additionally, holes and/or other preparations for bindings may be formed directly in the photographic paper and/or the stiffener.

In a preferred embodiment of the invention, the pages of the album are laminated after they are printed, to protect the images. The laminate may, in some preferred embodiments of the invention, serve as a stiffener. Alternatively to a book type album, in some preferred embodiments of the invention, the photographs are printed onto a continuous sheet and then folded into an accordion. Alternatively, such an accordion is bound on one side and the pages separated on the other side, to form a book.

Composition instructions relate to forming compound images from individual images. The main types of compound images are panoramic views, which are generally one dimensional and mosaics, which are generally two dimensional. Composition images can also link graphics and real images and/or comprise montages.

Figure 3:
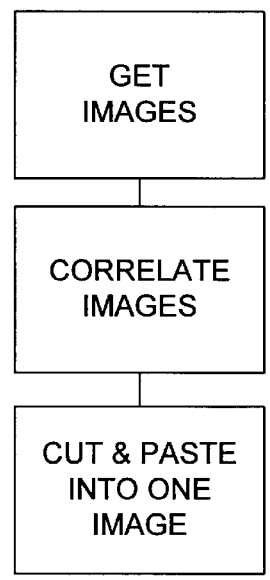
FIG. 3 is a flowchart of a method for generating an image mosaic, in accordance with a preferred embodiment of the invention.

FIG. 3 is a flowchart of a method of generating an image mosaic, in accordance with a preferred embodiment of the invention. In the first step, the images to be combined are provided. In some cases, all the images will be combinable, in other cases, the service provider will be required to automatically determine which images should be combined.

The second step is to correlate the images to determine overlap between them. In this stage it is also possible to cluster the provided images into groups, within each group all the images being related by a correlation criteria. In most real situations, images which are not acquired as a panoramic view are not usually related by such a criteria.

After the images are correlated, the images in each group are combined to form a single combination image, by cutting and pasting of image portions. Alternatively or additionally, images and/or image portions are enlarged, reduced and/or morphed to fit. Preferably, the seams between image portions are smoothed. Alternatively, such seams may be specially marked to indicated that two different image portions are utilized.

In a preferred embodiment of the invention, the customer may indicate which image is the central image of the mosaic. Alternatively or additionally, the customer may indicate a master image, which is to be maintained as whole as possible. Thus, where the subject matter overlaps with another image, the portions of the master image are preferentially used in the mosaic. Alternatively or additionally, a hierarchy of priorities is defined between the images, preferably based on time of acquisition. For example, image portions from later images are always preferred over image portions of earlier, partially overlapping, images.

Another type of composite image is a region of interest (ROI) image. In such an image, an overview image is printed as well as one or more detail images. In accordance with a preferred embodiment of the invention, the footprint of each of the detail images on the overview image is marked on the overview. Preferably, there is also provided a graphic, such as a line, connecting the mark on the overview image to the detail image, which is printed inside the overview image.

Alternatively or additionally, a label, identifying the detail image, is placed on the overview image. Alternatively or additionally, the detail image is printed covering a portion of the overview image. Preferably, a low information portion of the overview image, such as a sky portion, is utilized for such an embodiment.

The overview in one type of ROI image is a graphic such as a map. Such a map may be a graphic layout of a gallery, in which case there may be no correlation between the overview image and the individual images. The customer may indicate the connection between each individual image and the overview image. Alternatively or additionally, image annotations, such as text labels may be used to match detail images to overview images. In a preferred embodiment of the invention, the service provider maintains a database of maps and layouts for cities and/or galleries and/or other types of common tourist sites. In addition, the service provider preferably maintains a database of detail images for such sites, to be used if the customer is missing a particular image and desires a replacement. Preferably, the service provider automatically arranges the images so that the overview image and the enlargement images are all on the same page and preferably in respective related positions on the page.

Still another type of composite image is formed from a plurality of images of the same object, acquired at a time delay from each other. In such an image, all the images may be shown, with the portion of the image including the changes preferably being marked. In a preferred embodiment of the invention, the automatic arrangement maintains a correct temporal order of the images. Additionally or alternatively, all the images are arranged on a single page, optionally with a graphic, such as a line, connecting them, to indicate the order of the acquisition of the images.

In a preferred embodiment of the invention, an index section, related to composite images is provided. Such a section can be automatically generated and ordered by sections of the album, by the label text and/or by the type of the image and or by other grouping thereof. Each index entry is preferably associated with a thumbnail image of the relevant image. Alternatively to using thumbnail images, images which contain only a portion of the original images may be used for indexing. It should be appreciated that preparing such an index using paper pictures is a very difficult task, which can be performed automatically, by some preferred embodiments of the system described herein.

In accordance with a preferred embodiment of the invention, the number of images may be large enough so that the images are divided into more than one album. Therefore, an index album for all the generated albums is also preferably generated.

Background instructions define the appearance of the background of album pages. In standard photographic albums, the background is usually patterned or a matte white. In accordance with a preferred embodiment of the invention, any pattern and/or background image and/or graphic and/or text and/or color and/or combination thereof may be selected to serve as a background for the arranged images. Further, each page of the album may have a different pattern.

Formatting instructions describe the size and aspect ratio and/or crop shape of the images. The formatting instructions can be for individual images, groups of images or for the entire image set. Some examples of formatting instructions include, absolute size of images; relative size, compared to album and/or other images; changes in aspect ratio of images; maximum and minimum sizes of images; enlargement of an image to fill an entire page; and non-rectangular cropping for images.

Processing instructions define what, if any, image processing techniques to apply to images. These techniques may be applied to individual images, groups of images or images which meet a certain (image processing) criteria. Some common types of image processing, which can be applied to color images include, histogram equalization, color correction, motion deblurring and contrast enhancements. It should be noted that the customer can select practically any type of image processing technique to apply. Further, a human programmer at the service supplier can program a particular image processing technique, on request by the customer. In a preferred embodiment of the invention, image processing takes into account acquisition parameters, which are associated with individual images. It should be noted, that image deblurring is typically much easier to perform when such parameters are known.

In a preferred embodiment of the invention, images, which are grouped together, are on the same page and/or which form parts of a single compound image, are preferably processed to become more uniform. Fore example, in a mosaic, the relative brightness and/or color balance of images making up the mosaic are preferably adjusted, to make the component images more similar. In a grouping, it is also sometimes desirable that all the images have a similar range of intensity values.

In many cases, the customer will be unable (or unwilling) to compose a complete set of instructions. Theme instructions allow a customer to select a predetermined theme which can include many of the above instruction sets. Thereafter, a customer can modify individual ones of the instructions to match the theme to his needs. Such a theme may be stored at the customer's computer or at the service provider. An example theme is a "trip in Europe" theme. This theme includes sections in the photographic album for different cities and landscapes. Each city section includes sub-sections for historical buildings, for art galleries and for portraits of travelers with a famous monument in the background. In addition, each image includes the date at which is was acquired, as well as any user supplied label. Each city section may also have a user supplied title, in which case, each city may have a different background. For example, the background may be an exemplary image from that city. Alternatively, the background can be supplied by the service provider, responsive to the identification of the city. Alternatively, the customer either suggests or is prompted to select one or more of the images as a background image.

It should be noted that matching a large number of images to an existing theme is a mostly automatic process. Typically, the input from the customer will be provided after the images are matched to the theme, for example, by the customer attaching a title label to a city section. The number of city sections may be automatically determined based on the time and/or date of the acquisition of the images. Further, the digital camera may include a feature by which images from each city are separately stored. Another example of a standard theme is a wedding theme.

As can be appreciated, in some cases the automatic arrangement may not be to a particular individual's taste. In accordance with a preferred embodiment of the invention, a customer can make final changes to the arrangement of an album. Preferably, these changes are entered as a limitation on the automatic formatting, for example, forcing a page break or changing the size of an image. Thus, the album can be rearranged after the customer enters his requirements.

It should be appreciated that the above described method of generating an album contains many features, not all of which need be practiced in all embodiments of the invention. Rather, various embodiments of the invention will utilize only some of the above described techniques, features or methods. In addition, it should be appreciated that the above described methods of arranging images and/or text in an album may also be applied, in some preferred embodiments of the invention, to the arrangement of images on other objects, such as T-shirts.

It will be appreciated by a person skilled in the art that the present invention is not limited by what has thus far been described. Rather, the present invention is limited only by the claims which follow.

What is claimed is:

1. A method of generating a photographic album, comprising:

providing a plurality of digitally encoded images;

automatically determining, by a processor, at least one characteristic of at least one of the provided images from an analysis of the visual data in the at least one image;

selecting a plurality of the provided images; and arranging the selected images so as to generate an album, wherein at least one of the selecting or the arranging is performed automatically, by the processor, responsive to the at least one characteristic.

2. A method according to claim 1, wherein providing the plurality of digitally encoded images comprises providing at least some of the images with associated data and wherein the arranging or selecting are performed responsive to the associated data of the at least some of the images.

3. A method according to claim 2, wherein the associated data comprises acquisition times and wherein automatically arranging comprises arranging said images according to the acquisition time of the images.

4. A method according to claim 2, wherein the associated data comprises annotations or titles of at least some of said images.

5. A method according to claim 1, wherein providing the plurality of digitally encoded images comprises transmitting the images over a network which connects a plurality of remote processors.

6. A method according to claim 1, wherein determining the at least one characteristic comprises determining a type of the at least one of said images.

7. A method according to claim 1, wherein determining the at least one characteristic comprises determining a time of acquisition of the at least one of said images.

8. A method according to claim 1, wherein determining the at least one characteristic comprises determining a location of acquisition or a content of the at least one of said images.

9. A method according to claim 1, wherein determining the at least one characteristic comprises determining an image quality measure of the at least one of said images.

10. A method according to claim 1, wherein determining the at least one characteristic comprises determining an image size of the at least one of said images.

11. A method according to claim 1, wherein determining the at least one characteristic comprises determining a photographic condition of the at least one of said images.

12. A method according to claim 1, wherein determining the at least one characteristic comprises determining at least one association of ones of said images to a composite image.

13. A method according to claim 1, wherein selecting all the provided images.

14. A method according to claim 1, wherein selecting comprises selecting images based on the number of repetitions of images.

15. A method according to claim 1, comprising grouping the selected images into a plurality of groups, and wherein selecting the images comprises separately selecting images from each of the plurality of groups.

16. A method according to claim 1, comprising grouping the selected images into a plurality of groups, and wherein arranging the images comprises arranging the images responsive to the grouping.

17. A method according to claim 1, wherein the images are provided in a first order and wherein automatically arranging comprises arranging in a second order different from the first order.

18. A method according to clam 1, comprising providing at least one parameter of a desired album and wherein at least the selecting or arranging of the images is performed responsive to the at least one parameter of the desired album.

19. A method according to claim 18, wherein the at least one parameter off the desired album comprises a desired size, cost or external form of the album.

20. A method according to claim 1, wherein arranging comprises changing the size of at least one of said images.

21. A method according to claim 20, wherein changing the size of the at least one of said images comprises automatically selecting the at least one of said images whose size is changed responsive to the at least one characteristic.

22. A method according to claim 1, wherein automatically arranging comprises arranging images on a page of said album so that the images on the page have a predetermined symmetry.

23. A method according to claim 1, comprising automatically processing, by the processor, at least one of the provided images, using an image processing technique.

24. A method according to claim 23, wherein processing comprises motion deblurring, color correcting or histogram equalizing of the processed images.

25. A method according to claim 23, wherein processing comprises generating a composite image from a plurality of the provided images.

26. A method according to claim 1, comprising providing the processor with a set of instructions and wherein at least the selecting or arranging is performed responsive to the provided set of instructions.

27. A method according to claim 26, wherein the set of instructions defines a theme of a desired album.

28. A method according to claim 26, wherein providing the processor with a set of instructions comprises selecting a set of instructions from a plurality of instruction sets presented by the processor.

29. A method according to claim 1, comprising generating an index for said album.

30. A method according to claim 29, wherein a plurality of the images are associated with text labels and wherein generating an index comprises generating an index according to contents of the text labels associated with the images.

31. A method according to claim 29, wherein said album comprises a plurality of pages and the index includes page number references.

32. A method according to claim 1, wherein arranging comprises arranging a plurality of images on a single page of the album.

33. A method according to claim 1, comprising:

providing the album to a customer;

receiving comments on the album from the customer; and repeating at least the selecting or responsive to the received comments.

34. A method according to claim 33, wherein providing the album to the customer comprises providing an electronic copy of the album.

35. A method according to claim 33, wherein the album comprises a plurality of individual pages and providing the album to the customer comprises allowing interactive access to individual pages of the album.

36. A method according to claim 1, comprising printing at least one image of said album on photographic paper.

37. A method according to claim 36, wherein printing comprises printing labels on at least one page of said album.

38. A method according to claim 36, wherein printing comprises printing a background around at least one image on at least one page of said album.

39. A method according to claim 38, wherein said background comprises one of said images.

40. A method according to claim 38, wherein at least two different backgrounds are printed for at least two different pages of said album.

41. A method according to claim 1, comprising printing the generated album on a plurality of papers responsive to the arrangement and binding the papers together.

42. A method of generating a photographic album, comprising:
provdiing a plurality of digitally encoded images;
providing an external format of a multi-page album;
selecting at least one of the provided images; and
automatically arranging the selected images, by a processor, in accordance with the external format of the album.

43. A method according to claim 42, comprising printing the images on a plurality of papers responsive to the arrangement and binding the papers together.

44. A method according to claim 42, wherein the external format of the album comprises at least one page with areas for binding, on which images should not be arranged.

45. A method according to claim 42, wherein the external format of the album comprises at least one page with a non-rectangular shape.

46. A method according to claim 42, wherein arranging comprises determining at least one characteristic of at least one of the images and arranging responsive to the at least one characteristic.

47. A method according to claim 46, wherein determining the at least one characteristic comprises extracting the at least one characteristic from visual data of the image, automatically by the processor.

48. A method according to claim 46, wherein determining the at least one characteristic comprises acquiring the at least one characteristic along with the image.

49. A method according to claim 42, wherein automatically arranging comprises arranging responsive to a content of the images.

50. A method according to claim 42, wherein automatically arranging comprises arranging irrespective of an order of acquisition of the images.

51. A method according to claim 42, wherein the images are provided in a first older and wherein automatically arranging comprises arranging in a second order different from the first order.

52. A method of generating a photographic album, comprising:
providing a plurality of digitally encoded images;
providing an external format of an album which includes at least one page with holes;
selecting at least one of the provided images; and
automatically arranging the selected images, by a processor, in accordance with the external format of the album.

53. A method of generating a photographic album, comprising:
providing a plurality of digitally encoded images;
providing an external format of an album which includes at least one non-rectangular page;
selecting at least one of the provided images; and
automatically arranging the selected images, by a processor, in accordance with the external format of the album.

54. A method of generating a photographic album, comprising:
providing a plurality of digitally encoded images;
selecting at least one of the provided images; and
automatically arranging he selected images on at least one page responsive to a criteria other than a time of acquisition, by a processor, so as to generate an album.

55. A method according to claim 54, wherein automatically arranging comprises arranging also responsive to the time of acquisition.

56. A method according to claim 54, wherein providing the images comprises transmitting the images over a network which connects a plurality of remote processors.

57. Apparatus for generating an album comprising:
a network connector, adapted to receive data from a computer network;
an image store, which receives and stores a plurality of digitally encoded images from the network; and
an image arranger which automatically generates an arrangement of at least some of the received images on a plurality of pages, forming a multi page album upon activation by a user.

58. Apparatus according to claim 57, wherein the network connector comprises an interface to a network which connects a plurality of remote processors.

59. Apparatus according to claim 57, wherein the image store receives and stores data attached to at least some of the images and the image anger arranges the images responsive to the attached data.

60. Apparatus for generating an album comprising:
a network connector, adapted to receive data from a computer network;
an image store, which receives and stores a plurality of digitally encoded images from said network;
an image analyzer, which analyses the visual data of at least some of said images; and
an image arranger which automatically generates an arrangement of images, for an album, for at least some of said plurality of images, responsive to said analysis.

61. Apparatus according to claim 60, comprising an instruction store, which stores a plurality of different sets of instructions for arrangement, wherein said image a ranger arranges said images responsive to one or more of said sets of instructions.

62. Apparatus according to claim 61, wherein the network connector receives indication of which of the sets of instructions is to be used in the arrangement, from a customer.

63. Apparatus according to claim 60, comprising an album generator, which generates an album responsive to said arrangement.

64. Apparatus according to claim 63, wherein said generated album comprises an electronic album.

65. Apparatus according to claim 63, wherein said generated album comprises a photographically printed album.

* * * * *

UNITED STATES PATENT AND TRADEMARK OFFICE
CERTIFICATE OF CORRECTION

PATENT NO. : 6,324,545 B1 Page 1 of 1
APPLICATION NO. : 08/950931
DATED : November 27, 2001
INVENTOR(S) : Guy Morag It is certified that error appears in the above-identified patent and that said Letters Patent is hereby corrected as shown below:

Column 14, line 63, after "or" insert --arranging--

Column 15, line 56, "older" should read --order--

Column 16, line 15, "he" should read --the--

Column 16, line 38, "anger" should read --arranger--

Column 16, line 53, "a ranger" should read --arranger--

Signed and Sealed this

Sixteenth Day of September, 2008

JON W. DUDAS
*Director of the United States Patent and Trademark Office*